C. W. JOHNSON.
ROCK DRILL.
No. 49,034. Patented July 25, 1865.
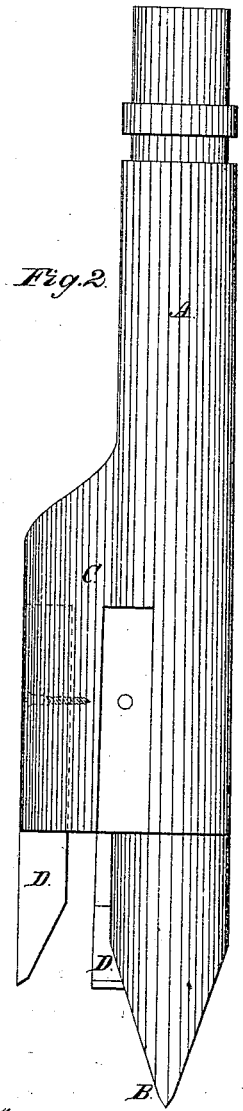
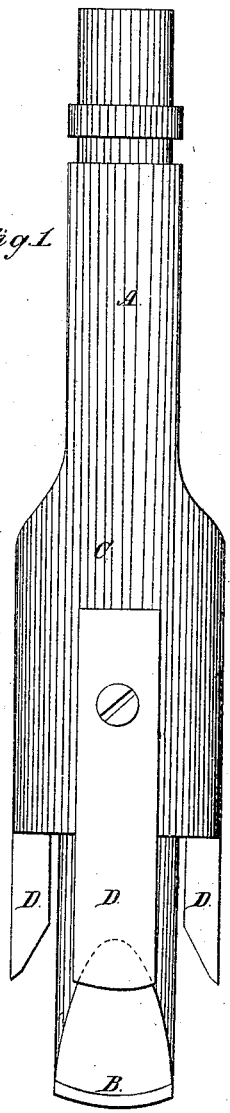
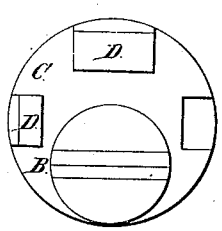

UNITED STATES PATENT OFFICE.

CHARLES W. JOHNSON, OF WATERBURY, CONNECTICUT, ASSIGNOR TO HIRAM DAILEY AND S. ATWATER.

IMPROVEMENT IN ROCK-DRILLS.

Specification forming part of Letters Patent No. 49,034, dated July 25, 1865.

*To all whom it may concern:*

Be it known that I, CHARLES W. JOHNSON, of Waterbury, New Haven county, State of Connecticut, have invented certain new and useful Improvements in Drills for Drilling Rocks and Boring Oil and other Wells; and I do hereby declare that the following description and accompanying drawings are sufficient to enable any person skilled in the art or science to which it most nearly appertains to make and use my said invention or improvements without further invention or experiment.

The nature of my invention and improvements in drills for wells and other purposes consists in making an enlargement eccentrically on the drill or shaft carrying one or more cutters, so as to cut a hole nearly or quite twice as large as the drill, so as to drill through a tube and cut a hole large enough to let the tube follow the drill, which works below the bottom of the tube; also, in making the cutters on the enlargement removable, so that they can be taken from the enlargement and sharpened or others put in their places.

In the accompanying drawings, Figure 1 is a front elevation of my drill, and Fig. 2 is a side elevation of the same.

In these drawings, A is the shaft, and B the cutting portion or point, of the drill, and C the enlargement, made in the form shown in the drawings—that is, eccentrically on the shaft or drill—and of a proper length to carry one or a number of cutters to enlarge the hole drilled and cut it so much larger than the drill that a tube or pipe may be sunk around the drill-shaft, above the enlargement C, large enough to allow the drill to be withdrawn through the tube to be sharpened or repaired, the drill working—that is the enlargement—below the end of the tube and cutting a hole large enough for the tube to follow the drill, so that the tube can be forced or dropped down behind the drill at intervals as the work of boring progresses. To make this drill a piece of iron or steel may be taken the size of the enlargement C, and of sufficient length so that a part of it may be drawn down to form the shaft A at the upper end, and a portion at the lower end to form the drill B, which, if the large piece is iron, must have a steel point welded in to form the cutting-edge of the drill. If the piece taken for the large part is steel, the cutters D D D may be forged onto it at the lower end; but if it is iron pieces of steel may be welded on to form the cutters; or there may be grooves cut in the enlargement C, dovetailing or otherwise, for the shanks of the cutters D, and they may be fastened by screws, as shown in the drawings, so that the cutters may be removed and sharpened and replaced, or others put in their places when required.

The upper end of the shaft A may be made of such length as may be desired, and provided with a screw-thread or other means of coupling or connection; and below the screw or coupling there may be one or a series of collars and grooves, by which the drill may be seized by forceps and drawn out, should it get uncoupled or disconnected. The upper end of the enlargement C should be beveled or slanted off, as shown in the drawings, so that it will come into the tube readily when it is drawn up.

I claim—

1. In combination with the drill B, the enlargement C, extending eccentrically from the drill and shaft, and carrying one or more cutters.

2. Beveling or slanting up the top of the enlargement C, so that it will enter the lower end of the tube freely.

CHARLES W. JOHNSON.

Witnesses:
S. M. CATE, Jr.,
S. W. KELLOGG.